United States Patent
Engstrom

(10) Patent No.: US 10,821,959 B2
(45) Date of Patent: Nov. 3, 2020

(54) PREDICTIVE AUTOMOTIVE TRANSMISSION CONTROL USING DATA SENSING SYSTEM

(71) Applicants: Hyundai Motor Company, Seoul (KR); Kia Motors Corporation, Seoul (KR)

(72) Inventor: Joshua Engstrom, Belleville, MI (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/366,712

(22) Filed: Mar. 27, 2019

(65) Prior Publication Data
US 2020/0307542 A1    Oct. 1, 2020

(51) Int. Cl.
  *B60W 30/095*   (2012.01)
  *B60W 10/06*    (2006.01)
  *F16H 61/02*    (2006.01)
  *B60W 30/16*    (2020.01)

(52) U.S. Cl.
  CPC ........ *B60W 10/06* (2013.01); *B60W 30/0956* (2013.01); *B60W 30/162* (2013.01); *F16H 61/0213* (2013.01); *F16H 2061/0227* (2013.01)

(58) Field of Classification Search
  None
  See application file for complete search history.

(56) References Cited

U.S. PATENT DOCUMENTS

| | | | |
|---|---|---|---|
| 5,462,500 A | 10/1995 | Benford et al. | |
| 2008/0027613 A1 | 1/2008 | Bai et al. | |
| 2017/0080931 A1* | 3/2017 | D'Amato | B60W 30/143 |
| 2018/0017157 A1* | 1/2018 | Noguchi | F16H 59/66 |
| 2019/0384322 A1* | 12/2019 | Luckevich | G05D 1/0293 |

* cited by examiner

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A method for controlling a transmission of a host vehicle can include: collecting preceding vehicle information characterizing a preceding vehicle which precedes the host vehicle using one or more sensing devices of a data sensing system equipped in the host vehicle; predicting whether a deceleration event will occur based on the collected preceding vehicle information; adjusting a downshifting schedule of the transmission in response to predicting that the deceleration event will occur; and controlling an operation of the transmission such that the transmission executes one or more downshifting operations in accordance with the adjusted downshifting schedule.

19 Claims, 5 Drawing Sheets

PREDICTIVE AUTOMOTIVE TRANSMISSION CONTROL USING DATA SENSING SYSTEM

TECHNICAL FIELD

The present disclosure relates generally to automotive transmission control, and more particularly, to predictive automotive transmission control using a data sensing system.

BACKGROUND

Automatic transmission systems have been designed for vehicles to automatically change gear ratios without manual input while the vehicle is being driven. The purpose of an automatic transmission is to enable an engine to operate within a narrow range of speeds while providing a wide range of output speeds. When operating efficiently, the automatic transmission can enable the engine to deliver sufficient power to the vehicle drivetrain across a wide range of speeds.

To this end, automatic transmission systems often operate in accordance with a predefined shift schedule intended to dictate the performance of the automatic transmission in an optimal manner. The shift schedule can inform the automatic transmission of specific conditions under which to perform an upshift or downshift operation. For example, the shift schedule can define specific vehicle speeds or engine revolutions per minute (RPM) levels at which to perform an upshift or downshift operation. A transmission control unit (TCU) can detect vehicle inputs, such as speed or engine RPM, and control the automatic transmission according to the shift schedule while the vehicle is being driven.

With respect to downshifting, in particular, when the vehicle speed or engine RPM level decreases below a given predefined limit according to the shift schedule, i.e., the engine is turning too slowly, the transmission may automatically shift into a lower gear so that the engine turns faster under the same power. In the case of detecting a hard or sudden deceleration, however, the automatic transmission may be unable to downshift quickly enough to complete all necessary downshifts prior to re-acceleration. As a result, the driver may attempt to re-accelerate in a higher gear than is required to provide optimal power. This phenomenon can cause delays in acceleration and lead to poor drivability.

SUMMARY OF THE DISCLOSURE

The present disclosure provides techniques for predictive automotive transmission control which can allow for earlier downshifting. Using one or more sensors in a data sensing system, such as an advanced driver-assistance system (ADAS) or a vehicle-to-everything (V2X) communication system, equipped in the vehicle (i.e., "host vehicle"), information characterizing the state of a preceding vehicle can be collected. When the collected information indicates that the preceding vehicle is decelerating, it can be predicted that the host vehicle will have to decelerate in the near future, prior to actual braking of the host vehicle. In such case, a control unit of the host vehicle can adjust the downshifting schedule of the automatic transmission so that the transmission initiates the downshifting operations earlier than conventionally possible, enabling the transmission to complete the necessary downshifts during deceleration. The acceleration performance of the vehicle can thus be improved since the transmission can operate in a lower gear upon re-acceleration.

According to embodiments of the present disclosure, a method for controlling a transmission of a host vehicle can include: collecting preceding vehicle information characterizing a preceding vehicle which precedes the host vehicle using one or more sensing devices of a data sensing system equipped in the host vehicle; predicting whether a deceleration event will occur based on the collected preceding vehicle information; adjusting a downshifting schedule of the transmission in response to predicting that the deceleration event will occur; and controlling an operation of the transmission such that the transmission executes one or more downshifting operations in accordance with the adjusted downshifting schedule.

The method can further include: monitoring a speed of the preceding vehicle and a distance between the preceding vehicle and the host vehicle using the collected preceding vehicle information; and predicting that the deceleration event will occur based on the speed of the preceding vehicle and the distance between the preceding vehicle and the host vehicle.

The method can further include: detecting a change of the speed of the preceding vehicle or a change of the distance between the preceding vehicle and the host vehicle; determining whether the preceding vehicle is decelerating based on the change of the speed of the preceding vehicle or the change of the distance between the preceding vehicle and the host vehicle; and predicting that the deceleration event will occur when the preceding vehicle is determined to be decelerating.

The method can further include: detecting a change of the speed of the preceding vehicle or a change of the distance between the preceding vehicle and the host vehicle; determining whether the preceding vehicle is decelerating based on the change of the speed of the preceding vehicle or the change of the distance between the preceding vehicle and the host vehicle; and predicting that the deceleration event will occur when the preceding vehicle is determined to be decelerating and the preceding vehicle is located within a predetermined distance of the host vehicle.

The method can further include: detecting a change of the speed of the preceding vehicle or a change of the distance between the preceding vehicle and the host vehicle; determining whether the preceding vehicle is decelerating based on the change of the speed of the preceding vehicle or the change of the distance between the preceding vehicle and the host vehicle; and predicting that the deceleration event will occur when the preceding vehicle is determined to be decelerating beyond a predetermined deceleration value.

The adjusting of the downshifting schedule can include: selecting a predefined downshifting schedule among a plurality of predefined downshifting schedules; and adjusting the downshifting schedule based on the selected predefined down shifting schedule.

The adjusting of the downshifting schedule can include: collecting environmental information characterizing a surrounding environment of the host vehicle using the one or more sensing devices; detecting a traffic event based on the collected environmental information; and adjusting the downshifting schedule based on the detected traffic event.

The adjusting of the downshifting schedule can include: collecting environmental information characterizing a surrounding environment of the host vehicle using the one or more sensing devices; detecting a traffic sign based on the collected environmental information; and adjusting the downshifting schedule based on the detected traffic sign.

The adjusting of the downshifting schedule can include: collecting environmental information characterizing a surrounding environment of the host vehicle using the one or more sensing devices; detecting a road characteristic based on the collected environmental information; and adjusting the downshifting schedule based on the detected road characteristic.

The adjusting of the downshifting schedule can include: detecting at least one of a speed of the host vehicle and an acceleration amount of the host vehicle; and adjusting the downshifting schedule based on the at least one of the speed of the host vehicle and the acceleration amount of the host vehicle.

The method can further include: collecting environmental information characterizing a surrounding environment of the host vehicle using the one or more sensing devices; and detecting a presence of the preceding vehicle based on the collected environmental information.

The method can further include: determining whether to adjust the downshifting schedule based on whether the deceleration event predicted to occur.

The method can further include: controlling the operation of the transmission in accordance with a default downshifting schedule in response to predicting that the deceleration event will not occur.

The method can further include: adjusting the downshifting schedule before the host vehicle performs a braking operation in response to the predicted deceleration event.

The collecting of the preceding vehicle information can include: receiving, via a vehicle-to-everything (V2X) communication system of the host vehicle, V2X messages transmitted using V2X communication; and collecting the preceding vehicle information from the received V2X messages.

The collecting of the preceding vehicle information can include: detecting environmental information characterizing a surrounding environment of the host vehicle using one or more sensing devices of advanced driver-assistance system (ADAS) equipped in the host vehicle; and collecting the preceding vehicle information from the detected environmental information.

The one or more sensing devices can include one or more of a camera, a radar sensing device, a LiDAR sensing device, an ultrasonic sensing device, and a global positioning system (GPS) device.

Furthermore, according to embodiments of the present disclosure, a host vehicle equipped with a data sensing system can include: one or more sensing devices of the data sensing system configured to collect preceding vehicle information characterizing a preceding vehicle which precedes the host vehicle; and a control unit configured to: predict whether a deceleration event will occur based on the collected preceding vehicle information, adjust a downshifting schedule of a transmission of the host vehicle in response to predicting that the deceleration event will occur, and control an operation of the transmission such that the transmission executes one or more downshifting operations in accordance with the adjusted downshifting schedule.

Furthermore, according to embodiments of the present disclosure, a non-transitory computer readable medium containing program instructions for performing a method of controlling a transmission of a host vehicle can include: program instructions that predict whether a deceleration event will occur based on preceding vehicle information characterizing a preceding vehicle which precedes the host vehicle, the preceding vehicle information being collected using one or more sensing devices of a data sensing system equipped in the host vehicle; program instructions that adjust a downshifting schedule of a transmission of the host vehicle in response to predicting that the deceleration event will occur; and program instructions that control an operation of the transmission such that the transmission executes one or more downshifting operations in accordance with the adjusted downshifting schedule.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
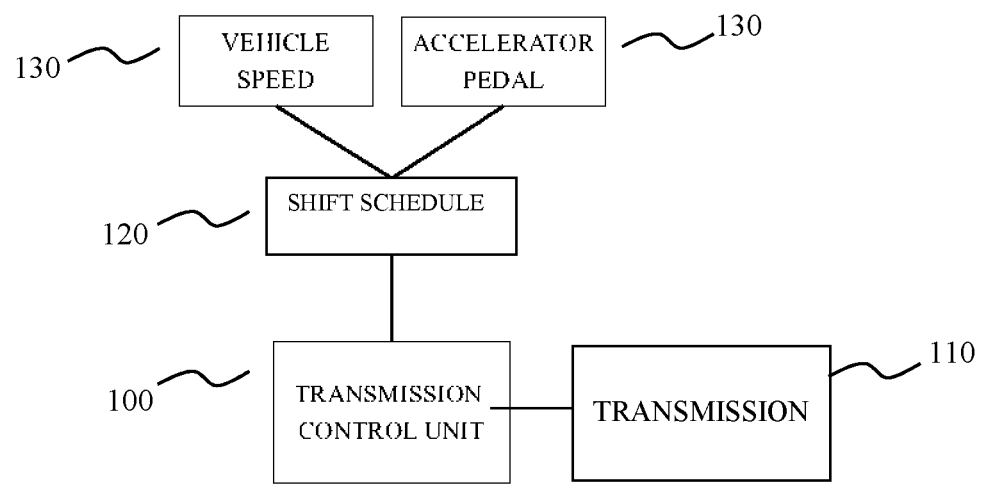
FIG. 1 is a diagram illustrating an exemplary simplified architecture for conventional automotive transmission control.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Additionally, it is understood that one or more of the below methods, or aspects thereof, may be executed by at least one control unit (e.g., electronic control unit (ECU), transmission control unit (TCU), etc.). The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring first to FIG. 1, which illustrates a diagram of an exemplary simplified architecture for conventional automotive transmission control, a transmission control unit (TCU) 100 of a vehicle (referred to herein as "host vehicle") can control the shifting (i.e., upshifting and downshifting) operations of an automatic transmission 110 of the host vehicle according to a predefined shift schedule 120. Particularly, the TCU 100 can use host vehicle parameters 130 as inputs, including, for example, vehicle speed and accelerator pedal (or throttle) percentage, in order to maintain the engine revolutions per minute (RPM) within a defined range.

Figure 2:
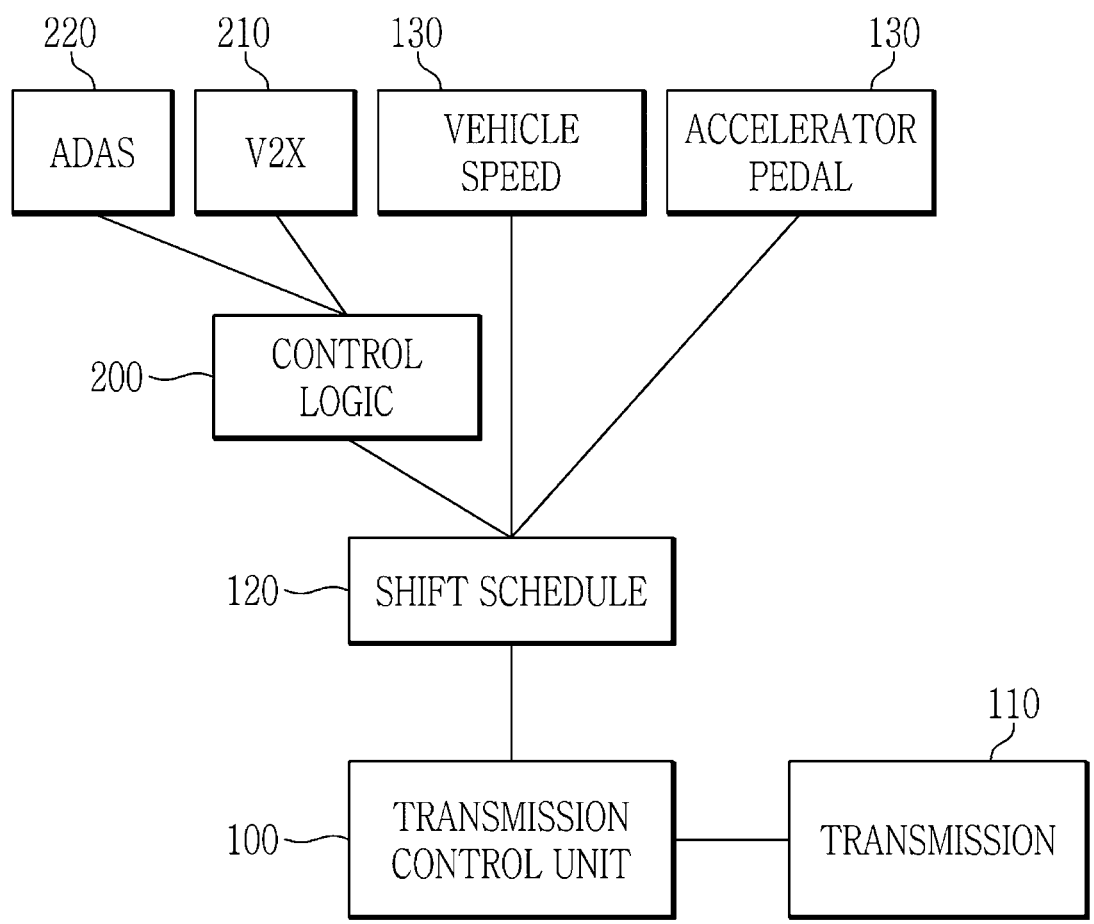
FIG. 2 is a diagram illustrating an exemplary simplified architecture for predictive automotive transmission control using one or more data sensing systems.

Whereas conventional transmission controls are reactive only to driver or vehicle input, FIG. 2 is a diagram illustrating an exemplary simplified architecture for predictive automotive transmission control using one or more data sensing systems. As shown in FIG. 2, a data sensing system equipped in the host vehicle, such as a vehicle-to-everything (V2X) communication system 210, an advanced driver-assistance system (ADAS) 220, or the like, can collect information characterizing the state of a vehicle which precedes the host vehicle (referred to herein as "preceding vehicle"). The control logic 200, as executed by a control unit (e.g., electronic control unit (ECU)), can utilize the information collected by the data sensing system 210 and/or 220 to determine whether the preceding vehicle is decelerating, and thus predict whether the host vehicle is likely to decelerate in advance of the deceleration event occurring. When it is predicted that the host vehicle is likely to decelerate, the control unit can adjust or optimize the downshifting schedule 120 of the transmission 110, enabling the TCU 100 to downshift the transmission 110 to a lower gear earlier than conventionally possible. As a result, the transmission 110 can operate in a lower gear upon re-acceleration, thereby improving acceleration force at lower speeds after deceleration, which can be particularly beneficial in city driving where frequent deceleration and acceleration is common.

Figure 3:
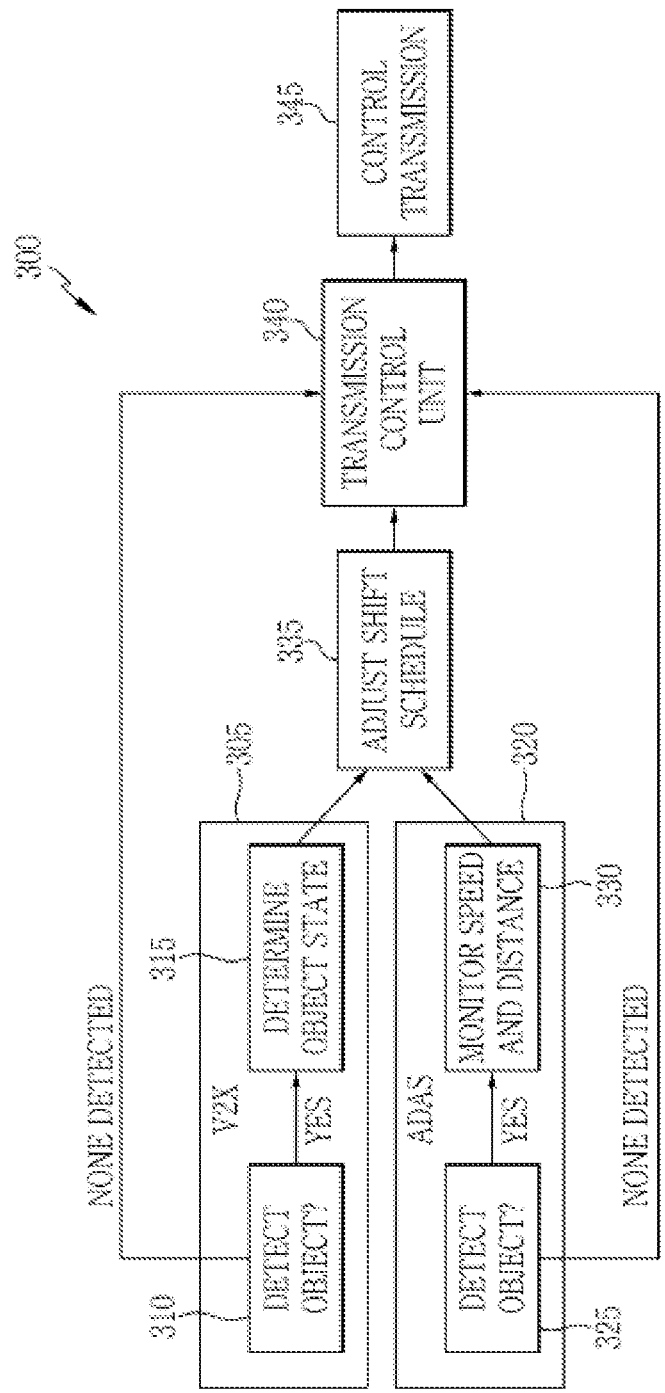
FIG. 3 is a flowchart illustrating an exemplary predictive control logic for the predictive automotive transmission control of FIG. 2.

In detail, FIG. 3 is a flowchart illustrating an exemplary predictive control logic 200 for predictive automotive transmission control. The predictive control logic 200 may include a procedure 300 that starts at step 305 or 320, and continues to step 310 or 325, where, as described in greater detail herein, a data sensing system, such as the V2X communication system 210 or ADAS 220, can collect information characterizing a preceding vehicle (referred to herein as "preceding vehicle information"), and the downshifting schedule 120 can be predictively optimized based on the collected preceding vehicle information, allowing the TCU 100 to downshift the transmission 110 to a lower gear earlier than conventionally possible.

The procedure 300 can start at either step 305 or 320 depending on the data sensing system(s) equipped in the host vehicle and the desired implementation. Alternatively, steps 305 and 320 can be performed concurrently. It is to be understood that any step or operation described below as performed by host vehicle can be executed by a control unit (e.g., ECU, TCU, etc.) of the host vehicle.

At step 305, the host vehicle can activate its V2X communication system 210 to communicate with other V2X-enabled entities via V2X communication. It is generally understood that V2X communications, or simply V2X, involves a dynamic wireless exchange of data between nearby V2X-enabled entities (e.g., vehicles, pedestrians, traffic equipment, routers, etc.) offering the opportunity for significant safety improvements. In some cases, V2X can use on-board dedicated short-range communication (DSRC) radio devices to transmit messages about a vehicle's speed, heading, brake status, and other information to other entities and receive the same messages in exchange. In other cases, V2X can communicate via wide-area networks (WANs), such as telecommunications networks, local-area networks (LANs), such as Ethernet or Wi-Fi, and so forth. V2X communication can include various specific implementations including, but not limited to, vehicle-to-vehicle (V2V) communication in which the host vehicle can communicate with other nearby vehicles, vehicle-to-pedestrian (V2P) communication in which the host vehicle can communicate with nearby pedestrians, vehicle-to-infrastructure (V2I) communication in which the host vehicle can communicate with V2I-enabled objects constituting traffic or travel infrastructure, such as a traffic light, vehicle-to-network (V2N) communication in which the host vehicle can communicate with nearby routers capable of sending traffic- or travel-related information, and the like.

These messages, known as Basic Safety Messages (BSMs), can be derived using non-vehicle-based technologies such as global positioning system (GPS) to detect a location and speed of a vehicle, or using vehicle-based sensor data where the location and speed data is derived from the vehicle's on-board computer. The vehicle-based sensor data can be combined with other data, such as latitude, longitude, and angle, to produce a richer, more detailed situational awareness of the position of other vehicles. Accordingly, exchanging messages with other V2X-enabled entities using V2X communication can enable the host vehicle to automatically sense the position of surrounding vehicles and other objects with 360-degree awareness as well as the potential hazard they present, calculate risk based on the position, speed, or trajectory of surrounding vehicles, issue driver advisories or warnings, and take pre-emptive actions to avoid and mitigate crashes.

For the purposes of the present disclosure, "V2X messages," "V2X data," "V2X information," or the like, may refer to messages, or information, generally, transmitted and/or received using V2X (or V2V, V2P, V2I, V2N, etc.) communication techniques. For instance, V2X messages may refer to Basic Safety Messages (BSMs) and may include information about a vehicle's speed, heading, brake status, location, fuel efficiency, and so forth, as described in further detail herein. Furthermore, the term "V2X-enabled entity" can refer to any object (e.g., vehicle, pedestrian, router, etc.) capable of participating in V2X communication, that is, transmitting and/or receiving V2X messages. Furthermore, the term "sensing devices" can include, among other devices, the DSRC radio devices of the host vehicle used for receiving V2X messages.

At step 310, the host vehicle can receive V2X messages via the V2X communication system 210 from one or more other V2X-enabled entities. The host vehicle can then use the collected V2X messages to detect a presence of a vehicle which precedes the host vehicle (i.e., "preceding vehicle"). The received V2X messages can include a wide range of information generally characterizing the surrounding environment of the host vehicle (i.e., "environmental information"). In some embodiments, the host vehicle can receive V2X messages directly from another vehicle. The received V2X messages can include information such as, for example, the other vehicle's speed, location, heading, and other information. Based on such information contained in the received V2X messages, as well as other information such as GPS-based data indicating a location of the host vehicle, the host vehicle can determine whether the other vehicle responsible for transmitting the received V2X messages is a preceding vehicle traveling ahead of the host vehicle. In other embodiments, the host vehicle can determine whether an object other than a vehicle is preceding the host vehicle, such as a pedestrian, a curvature in the road, a stop sign or light, or the like, which is capable of causing deceleration of the host vehicle, based on the information contained in the received V2X messages. While a preceding vehicle will be described below for demonstration sake, it is to be understood that procedure 300 can be applicable to any object preceding the host vehicle capable of causing the host vehicle to decelerate.

If no preceding vehicle is detected, the procedure 300 can continue to step 340, where the TCU 100 can control operation of the transmission 110 according to a default, i.e., unadjusted, downshifting schedule 120. In other words, if the host vehicle is unable to predict an upcoming deceleration event based on inputs from the V2X communication system 210, the TCU 100 can control operation of the transmission 110 according to the default downshifting schedule 120 (step 345).

Conversely, if a preceding vehicle is detected in step 310, the procedure 300 can continue to step 315, whereby the collected V2X messages can be used by the host vehicle to determine the state of the preceding vehicle. More specifically, the host vehicle can predict whether a deceleration event causing deceleration of the host vehicle will occur based on the state of the preceding vehicle.

In detail, upon detecting a preceding vehicle in step 310, the host vehicle can use the information contained in the V2X messages received from the V2X communication system 210, such as, for example, the preceding vehicle's speed, location, heading, etc., to monitor metrics indicative of whether the preceding vehicle is decelerating. The host vehicle can also use locally derived information characterizing the state of the host vehicle, such as a location of the host vehicle, a heading of the host vehicle, a speed of the host vehicle, or the like, in conjunction with the information contained in the received V2X messages when monitoring metrics indicative of whether the preceding vehicle is decelerating.

In one example, the host vehicle can use the V2X messages to monitor a speed of the preceding vehicle. By comparing multiple readings of the preceding vehicle's speed, the host vehicle can detect whether the preceding vehicle is decelerating or otherwise. Similarly, the host vehicle can compare the speed of the preceding vehicle with the speed of the host vehicle and predict whether the host vehicle is likely to decelerate (i.e., the host vehicle is traveling faster than and thus approaching the preceding vehicle).

In another example, the host vehicle can use the V2X messages to monitor the distance between the preceding vehicle and the host vehicle. By comparing multiple readings of the distance between the preceding and host vehicles, the host vehicle can detect whether it is approaching the preceding vehicle, thus requiring deceleration, or otherwise. In cases where an object other than a vehicle is detected ahead of the host vehicle, as described above, the host vehicle can similarly monitor the distance between it and the preceding object, and detect whether the distance is decreasing, indicating that deceleration is required.

The host vehicle can utilize the information contained in the V2X messages received from the V2X communication system 210, optionally in conjunction with locally derived data characterizing the state of the host vehicle, to monitor any metric or combination of metrics for predicting whether a deceleration event causing deceleration of the host vehicle will occur. In some embodiments, the host vehicle can monitor both of the speed of the preceding vehicle and the distance between the preceding vehicle and the host vehicle in order to predict whether the deceleration event will occur. In other embodiments, the host vehicle can monitor either the speed of the preceding vehicle or the distance between the preceding vehicle and the host vehicle in order to predict whether the deceleration event will occur.

In some cases, the host vehicle can use the V2X messages to calculate a deceleration amount of the preceding vehicle and determine whether the deceleration amount is sufficiently significant to predict that deceleration of the host vehicle is highly probable. For example, if the host vehicle detects that preceding vehicle is decelerating, the host vehicle can calculate the deceleration of the preceding vehicle using the decreasing speeds of the preceding vehicle and/or the decreasing distance between the host vehicle and the preceding vehicle, using formulae well-known in the art, and compare the deceleration to a predefined threshold to be determined by the system designer. In some cases, the predefined threshold can vary dynamically based upon the current speed of the host vehicle (i.e., deceleration of the preceding vehicle can be more likely to cause host vehicle deceleration when the host vehicle is traveling at faster speeds). If the calculated deceleration of the preceding vehicle is greater than or equal to the predefined threshold, it can be determined that the preceding vehicle is decelerating at a rate significant enough to affect the driving of the host vehicle, and the host vehicle can predict that the deceleration event causing deceleration of the host vehicle will occur. On the other hand, if the calculated deceleration of the preceding vehicle is less than the predefined threshold, it can be determined that the preceding vehicle is decelerating at a relatively insignificant rate unlikely to affect the driving of the host vehicle, and the host vehicle can predict that the deceleration event will not occur.

In some cases, the host vehicle can also use the V2X messages to determine whether the preceding vehicle is located within a predefined threshold distance of the host vehicle to be determined by the system designer. For instance, the host vehicle can detect that the preceding vehicle is decelerating, as described above, but if the preceding vehicle is not located within the predefined threshold distance of the host vehicle (e.g., the preceding vehicle is located far ahead of host vehicle), the host vehicle can determine that the deceleration event is not likely. On the other hand, if the preceding vehicle is located within the predefined threshold distance of the host vehicle (e.g., the preceding vehicle is located relatively close to the host vehicle), the host vehicle can predict that the deceleration event will occur. Thus, in some embodiments, the prediction of the deceleration event by the host vehicle can depend on either or both of the speed of the preceding vehicle and the distance between the preceding vehicle and the host vehicle.

Additionally, the host vehicle can determine that deceleration of the host vehicle is highly probable even if the preceding vehicle is not decelerating. For example, the host vehicle can use V2X information to determine that the preceding vehicle is traveling at a mostly constant speed, while also detecting that the distance between the host vehicle and the preceding vehicle is small. If the host vehicle detects that it is traveling a faster speed than the preceding vehicle using locally derived data (from a vehicle speed sensor equipped in the host vehicle, a GPS module, or the like), the host vehicle can again determine that deceleration of the host vehicle is highly probable.

In a similar manner, at step 320, the host vehicle can activate one or more advanced driver-assistance systems (ADAS) 220 to collect information characterizing the surrounding environment of the host vehicle. It is generally understood that ADAS refers to a system of sensors (i.e., "sensing devices") and processors designed to safely assist the driver in the driving process. ADAS often relies on inputs from multiple data sources, such as, for example, vehicle-mounted cameras, image processing, LiDAR, radar, ultrasonic sensing, GPS, and in-car networking. As an example, ADAS can utilize smart cameras capable of identifying road markings, traffic signs, traffic lights, vehicles, pedestrians, and other objects, as well as detecting related data such as the distance to an identified object. ADAS can also utilize LiDAR- or radar-based sensing devices for performance of similar tasks. Several specific ADAS implementations exist including, but not limited to, adaptive cruise control, advanced emergency braking, advanced emergency steering, lane assist, cross-traffic alerting, surround view, object detection, automatic parking, adaptive light control, blind spot monitoring, collision warning, pedestrian detection, traffic sign recognition, autonomous/semi-autonomous driving, and so forth.

For the purposes of the present disclosure, an "ADAS sensor" may refer to a sensor configured to be used by or within any ADAS application. The term "sensing devices" can include, among other devices, ADAS sensors. Furthermore, "ADAS data," "ADAS information," or the like, may refer to any data collected via one or more ADAS sensors.

At step 325, one or more ADAS sensors of the ADAS 220, which can be configured in the host vehicle to include any number or variety of ADAS applications, such as those described above, can collect information characterizing the surrounding environment of the host vehicle. The host vehicle can then use the collected ADAS data to detect a presence of a preceding vehicle, similar to the manner described above with respect to the V2X communication system 210. The collected ADAS data can include a wide range of information from a wide range of sources generally characterizing the surrounding environment of the host vehicle, as described above. In some embodiments, the ADAS data can include information such as, for example, the presence of other vehicles, traffic signs, traffic lights, road characteristics, traffic events, pedestrians, etc.

Based on the collected ADAS data, as well as other information such as GPS-based data indicating a location of the host vehicle, the host vehicle can determine whether an object is present ahead of the host vehicle. Furthermore, the host vehicle can use the ADAS 220 to identify the object ahead of the host vehicle. While a preceding vehicle will be described below for demonstration sake, it is to be understood that procedure 300 can be applicable to any object preceding the host vehicle capable of causing the host vehicle to decelerate, such as a pedestrian, a curvature in the road, a stop sign or light, or the like.

If no preceding vehicle is detected, the procedure 300 can continue to step 340, where the TCU 100 can control operation of the transmission 110 according to a default, i.e., unadjusted, downshifting schedule 120. In other words, if the host vehicle is unable to predict an upcoming deceleration event based on inputs from the ADAS 220, the TCU 100 can control operation of the transmission 110 according to the default downshifting schedule 120 (step 345).

Conversely, if a preceding vehicle is detected in step 325, the procedure 300 can continue to step 330, whereby the collected ADAS data can be used by the host vehicle to determine the state of the preceding vehicle. More specifically, the host vehicle can predict whether a deceleration event causing deceleration of the host vehicle will occur based on the state of the preceding vehicle.

In a manner similar to the process described above with respect to the received V2X messages, upon detecting a preceding vehicle in step 330, the host vehicle can use the information included in the ADAS data collected from the ADAS 220, e.g., object image data, object location data, etc., to monitor metrics indicative of whether the preceding vehicle is decelerating. The host vehicle can also use locally derived information characterizing the state of the host vehicle, such as a location of the host vehicle, a heading of the host vehicle, a speed of the host vehicle, or the like, in conjunction with the ADAS data when monitoring metrics indicative of whether the preceding vehicle is decelerating.

In one example, the host vehicle can use the ADAS data to monitor a speed of the preceding vehicle. By comparing multiple readings of the preceding vehicle's speed, the host vehicle can detect whether the preceding vehicle is decelerating or otherwise. Similarly, the host vehicle can compare the speed of the preceding vehicle with the speed of the host vehicle and predict whether the host vehicle is likely to decelerate (i.e., the host vehicle is traveling faster than and thus approaching the preceding vehicle).

In another example, the host vehicle can use the ADAS data to monitor the distance between the preceding vehicle and the host vehicle. By comparing multiple readings of the distance between the preceding and host vehicles, the host vehicle can detect whether it is approaching the preceding vehicle, thus requiring deceleration, or otherwise. In cases where an object other than a vehicle is detected ahead of the host vehicle, as described above, the host vehicle can similarly monitor the distance between it and the preceding object, and detect whether the distance is decreasing, indicating that deceleration is required.

The host vehicle can utilize the information embedded in the ADAS data, optionally in conjunction with locally derived data characterizing the state of the host vehicle, to monitor any metric or combination of metrics for predicting whether a deceleration event causing deceleration of the host vehicle will occur. In some embodiments, the host vehicle can monitor both of the speed of the preceding vehicle and the distance between the preceding vehicle and the host vehicle in order to predict whether the deceleration event will occur. In other embodiments, the host vehicle can monitor either the speed of the preceding vehicle or the distance between the preceding vehicle and the host vehicle in order to predict whether the deceleration event will occur.

In some cases, the host vehicle can use the ADAS data to calculate a deceleration amount of the preceding vehicle and determine whether the deceleration amount is sufficiently significant to predict that deceleration of the host vehicle is highly probable. For example, if the host vehicle detects that preceding vehicle is decelerating, the host vehicle can calculate the deceleration of the preceding vehicle using the decreasing speeds of the preceding vehicle and/or the decreasing distance between the host vehicle and the preceding vehicle, using formulae well-known in the art, and compare the deceleration to a predefined threshold to be determined by the system designer. In some cases, the predefined threshold can vary dynamically based upon the current speed of the host vehicle (i.e., deceleration of the preceding vehicle can be more likely to cause host vehicle deceleration when the host vehicle is traveling at faster speeds). If the calculated deceleration of the preceding vehicle is greater than or equal to the predefined threshold, it can be determined that the preceding vehicle is decelerating at a rate significant enough to affect the driving of the host vehicle, and the host vehicle can predict that the deceleration event causing deceleration of the host vehicle will occur. On the other hand, if the calculated deceleration of the preceding vehicle is less than the predefined threshold, it can be determined that the preceding vehicle is decelerating at a relatively insignificant rate unlikely to affect the driving of the host vehicle, and the host vehicle can predict that the deceleration event will not occur.

In some cases, the host vehicle can also use the ADAS data to determine whether the preceding vehicle is located within a predefined threshold distance of the host vehicle to be determined by the system designer. For instance, the host vehicle can detect that the preceding vehicle is decelerating, as described above, but if the preceding vehicle is not located within the predefined threshold distance of the host vehicle (e.g., the preceding vehicle is located far ahead of host vehicle), the host vehicle can determine that the deceleration event is not likely. On the other hand, if the preceding vehicle is located within the predefined threshold distance of the host vehicle (e.g., the preceding vehicle is located relatively close to the host vehicle), the host vehicle can predict that the deceleration event will occur. Thus, in some embodiments, the prediction of the deceleration event by the host vehicle can depend on either or both of the speed of the preceding vehicle and the distance between the preceding vehicle and the host vehicle.

Additionally, the host vehicle can determine that deceleration of the host vehicle is likely even if the preceding vehicle is not decelerating. For example, the host vehicle can use the ADAS data to determine that the preceding vehicle is traveling at a mostly constant speed, while also detecting that the distance between the host vehicle and the preceding vehicle is small. If the host vehicle detects that it is traveling a faster speed than the preceding vehicle using locally derived data (from a vehicle speed sensor equipped in the host vehicle, a GPS module, or the like), the host vehicle can again determine that deceleration of the host vehicle is likely.

After determining the state of the preceding vehicle in steps 315 and/or 330, and predicting that a deceleration event will (or is likely) to occur, the procedure 300 can continue to step 335 whereby the downshifting schedule 120 of the host vehicle transmission 110 can be adjusted. If it the deceleration event is not predicted to occur, the procedure 300 can bypass step 335 and continue to step 345 whereby the TCU 100 controls operation of the transmission 110 in accordance with a default (i.e., unadjusted) downshifting schedule 120.

It is also noted that the host vehicle can use the aforementioned V2X messages and/or ADAS data to monitor the state of the preceding vehicle over time. Thus, even if the host vehicle initially does not predict that a deceleration event will occur based on the collected preceding vehicle information, the host vehicle may continue to monitor the speed of the preceding vehicle, the distance between the preceding vehicle and the host vehicle, the speed of the host vehicle, in addition to other related metrics, in order to determine whether any of the aforementioned metrics change in real-time in such a manner that leads the host vehicle to predict that the deceleration event will occur. If, at any time, the host vehicle makes such a prediction, the downshifting schedule can be adjusted accordingly.

At step 335, the downshifting schedule 120 can be adjusted in response to predicting that the deceleration event will occur. Generally, vehicles can possess the downshifting schedule 120 for the purpose of downshifting (or upshifting) the transmission 110 to provide an optimal level of torque and allow the engine to run at a fuel efficient RPM at any given speed. In the present case, the downshifting schedule 120 can be predictively adjusted to enable the transmission 110 to downshift at a time earlier than conventionally possible, thereby resulting in subsequent improved acceleration performance due to the transmission 110 operating in a lower gear upon re-acceleration.

In some embodiments, the host vehicle can adjust one or more of the inputs of the downshifting schedule 120 such that the TCU 100 downshifts the transmission 110 at an earlier time. As an example, if the downshifting schedule 120 uses host vehicle speed and an accelerator pedal (throttle) percentage as inputs for determining when to perform a downshifting operation, the host vehicle can adjust the downshifting schedule 120 by increasing the speed threshold at which the downshifting operation is performed and/or increasing the accelerator pedal (throttle) percentage threshold at which the downshifting operation is performed such that the transmission 110 downshifts earlier than usual.

In some embodiments, the host vehicle can adjust the downshifting schedule 120 dynamically, in real-time, based upon information collected by the V2X communication system 210 and/or ADAS 220. In other embodiments, the host vehicle can adjust the downshifting schedule 120 by selecting a predefined downshifting schedule from among a plurality of predefined downshifting schedules. The predefined downshifting schedules can be stored in local memory, a remote server, or the like, and can correspond to specific situations or conditions encountered by the host vehicle. The selection of the predefined downshifting schedule can depend on the information collected by the V2X communication system 210 and/or ADAS 220.

The host vehicle can adjust the downshifting schedule 120 in various ways such that the adjustment is performed in an optimal manner based on the current circumstances. In some cases, the host vehicle can adjust the downshifting schedule 120 based on the preceding vehicle information collected by the V2X communication system 210 and/or ADAS 220. For example, if the host vehicle determines that the preceding vehicle is decelerating rapidly, the downshifting schedule 120 can be adjusted such that the successive transmission downshifts occur more quickly. Conversely, if the host vehicle determines that the preceding vehicle is decelerating slowly, the downshifting schedule 120 can be adjusted such that the successive transmission downshifts occur more gradually. Moreover, the host vehicle can utilize locally derived data, such as the speed of the host vehicle, the acceleration of the host vehicle, and the like, to determine the adjustment of the downshifting schedule 120.

Additionally, the host vehicle can adjust the downshifting schedule 120 based upon environmental information collected in real-time. The environmental information can be combined with, or considered independently of, the preceding vehicle information and host vehicle information described above for the purpose of adjusting the downshifting schedule 120 in an optimal manner given the current circumstances.

The host vehicle can collect environmental information characterizing a surrounding environment of the host vehicle using the V2X communication system 210 and/or the ADAS 220. The environmental information can include any information characterizing the environment surrounding the host vehicle such as, for example, detection of a traffic event (e.g., stop-and-go traffic, rush hour, construction, an accident, etc.), detection of a traffic sign (e.g., a stop sign, a yield sign, a stop light, a speed limit sign, etc.), detection of a road characteristic (e.g., a sharp turn, an intersection, a dead-end, a roundabout, etc.), and the like. For instance, the optimal downshifting schedule adjustment as the host vehicle approaches a sharp turn can differ from such adjustment while the host vehicle is in rush hour traffic. The host vehicle can be capable of performing algorithms for image detection and recognition well-known in the art to determine the contents of a traffic sign, for example.

If a particular environmental situation or feature is detected from the collected environmental information, the host vehicle can optimize the downshifting schedule 120 in accordance with the detected situation or feature. For example, if the host vehicle detects an upcoming stop sign or yield sign, or detects that the host vehicle is driving amid stop-and-go traffic, based on data collected by the V2X communication system 210 and/or the ADAS 220, the downshifting schedule 120 can be adjusted to reduce hesitation in typically present in frequent deceleration and acceleration patterns. Similarly, if the host vehicle detects heavy traffic based on data collected by the V2X communication system 210 and/or the ADAS 220, the downshifting schedule 120 can be adjusted to prevent unnecessarily frequent or "busy" shifting and thus improve predictability. Similarly, if the host vehicle detects a particular road feature, such as a sharp curve, a roundabout, a four-way intersection, or the like, the downshifting schedule 120 can be adjusted to improve the responsiveness of the vehicle.

At step 340, the TCU 100 can receive inputs indicating either that the downshifting schedule 120 has been adjusted, or that no preceding vehicle has been detected by the V2X communication system 210 and/or ADAS 220. Based on such input, at step 345, the TCU 100 can control operation of the transmission 110 such that the transmission 110 executes one or more downshifting operations in accordance with the adjusted downshifting schedule 120. Alternatively, the TCU 100 can control operation of the transmission 110 in accordance with the default, i.e., unadjusted, downshifting schedule 120 if no preceding vehicle was detected, or if a preceding vehicle was detected, but a deceleration event has not been predicted.

The procedure 300 illustratively ends at step 345. It should be noted that the steps shown in FIG. 3 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 4:
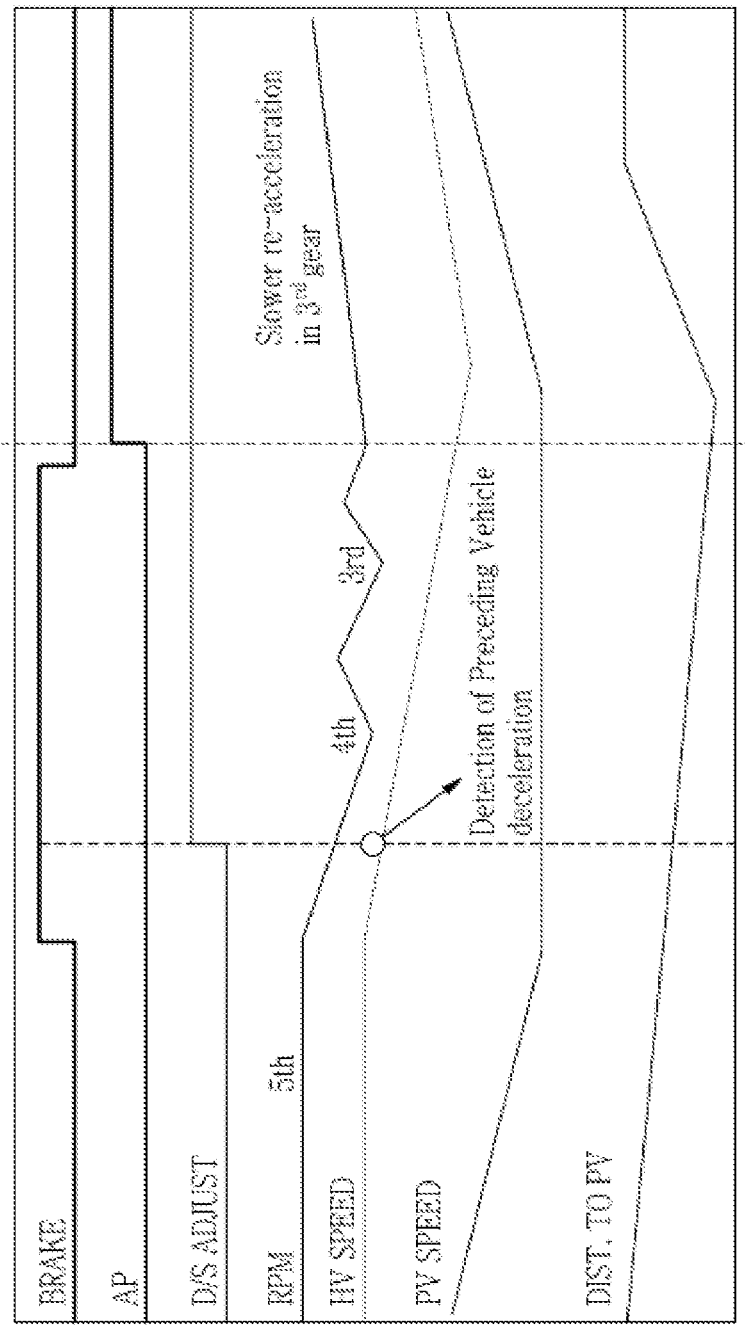
FIG. 4 is a chart illustrating an exemplary performance scenario in conjunction with the conventional automotive transmission control of FIG. 1.
Figure 5:
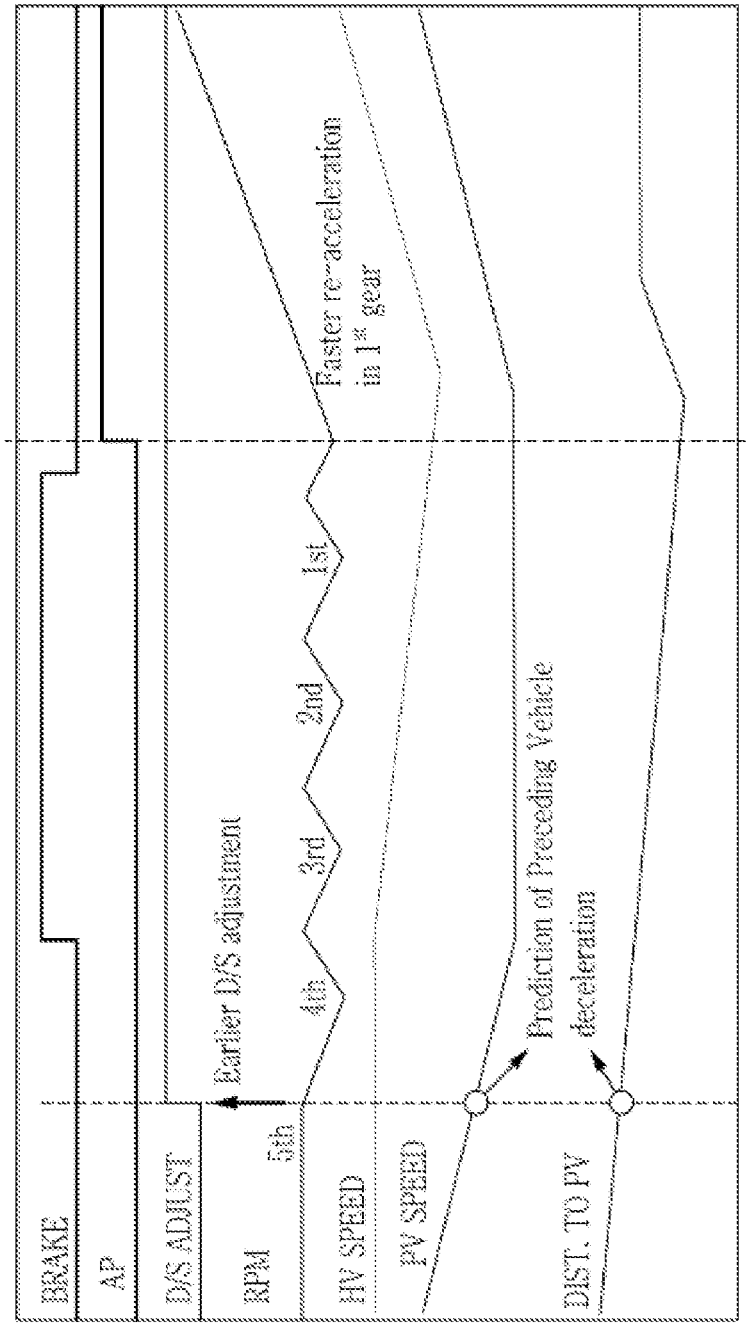
FIG. 5 is a chart illustrating an exemplary performance scenario in conjunction with the predictive automotive transmission control of FIG. 2.

Next, FIGS. 4 and 5 illustrate an exemplary performance scenario in which the host vehicle encounters a deceleration event causing the host vehicle to decelerate. Particularly, FIG. 4 is a chart illustrating an exemplary performance scenario in conjunction with conventional automotive transmission control, and FIG. 5 is a chart illustrating an exemplary performance scenario in conjunction with the predictive automotive transmission control described hereinabove. In both figures, the line labeled "BRAKE" corresponds to activation of the brake pedal of the host vehicle, the line labeled "AP" corresponds to activation of the accelerator pedal of the host vehicle, the line labeled "D/S ADJUST" corresponds to adjustment of the downshifting schedule 120, the line labeled "RPM" corresponds to the engine RPM of the host vehicle, as well as the current operating gear of the transmission 110, the line labeled "HV SPEED" corresponds to the speed of the host vehicle, the line labeled "PV SPEED" corresponds to the speed of the preceding vehicle, and the line labeled "DIST. TO PV" corresponds to the distance between the host vehicle and the preceding vehicle.

As illustrated in the exemplary scenario of FIG. 4, a preceding vehicle which precedes the host vehicle is decelerating. Likewise, the distance between the preceding vehicle and the host vehicle is decreasing. Eventually, the driver of the host vehicle recognizes the decelerating preceding vehicle and activates the brake pedal causing a reduction in the host vehicle's speed.

If the control unit of the host vehicle detects that a hard or sudden deceleration occurs, the control unit can adjust the downshifting schedule 120, as shown in FIG. 4. However, adjustment of the downshifting schedule 120, in the conventional case, occurs only in response to detecting the braking operation of the host vehicle. That is, the downshifting schedule 120 is adjusted after the braking operation of the host vehicle.

Once the driver of the host vehicle attempts to re-accelerate (corresponding to activation of the accelerator pedal), the speed of the host vehicle has decreased significantly. However, there has been insufficient time for the TCU 100 to downshift the transmission 110 to a lower gear suitable for acceleration, leaving the transmission in a higher gear, e.g., third gear. Consequently, re-acceleration performance is poor, causing a slow increase in the speed of the host vehicle, thus degrading the vehicle's drivability.

In contrast, applying the predictive automotive transmission control techniques described hereinabove, as illustrated in the exemplary scenario of FIG. 5, the TCU 100 of the host vehicle can utilize a predictively adjusted downshifting schedule 120 and reach lower gears of the transmission 110 much earlier. In detail, the preceding vehicle can decelerate, and the distance between the preceding vehicle and the host vehicle can decrease, in the same manner as shown in FIG. 4. Eventually, the driver of the host vehicle recognizes the decelerating preceding vehicle and activates the brake pedal causing a reduction in the host vehicle's speed.

Utilizing predictive automotive transmission control, however, the sensing devices of the V2X communication system 210 and/or ADAS 220 of the host vehicle can effectively monitor the speed of the preceding vehicle and the distance between the preceding vehicle and the host vehicle, in addition to other relevant metrics mentioned above. Thus, prior to activation of the brake pedal, the deceleration of the preceding vehicle can be detected using information collected by the V2X communication system 210 and/or ADAS 220, and based on such detection, the host vehicle can predict that a deceleration event will occur, the details of which being described above. Advantageously, the downshifting schedule 120 can be adjusted earlier than in the conventional scenario of FIG. 4, even before braking of the host vehicle, allowing additional time for the TCU 100 to sufficiently downshift the transmission 110 prior to re-acceleration.

In other words, regardless of the host vehicle's actual deceleration, the preceding vehicle information can trigger a downshifting schedule change. This can enable the TCU 100 to downshift the transmission 110 earlier than otherwise possible. Once the driver decides to re-accelerate the host vehicle, the transmission can be operating in lower gears, e.g., first gear, providing for stronger acceleration.

Accordingly, techniques are described herein that allow for predictive automotive transmission control using data sensing systems such as a V2X communication system, an ADAS, or the like. By monitoring metrics such as the speed of a preceding vehicle and the distance between the preceding vehicle and the host vehicle, deceleration of the host vehicle can be predicted before actual deceleration occurs. The predicted deceleration event can provide the TCU with additional time to complete the necessary downshifts of the transmission during deceleration. Beneficially, re-acceleration performance can be improved since the transmission operates in a lower gear after deceleration is completed due to earlier initiation of the downshifting operations, thus improving overall drivability of the vehicle.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for controlling a transmission of a host vehicle comprising:
    collecting preceding vehicle information characterizing a preceding vehicle which precedes the host vehicle using one or more sensing devices of a data sensing system equipped in the host vehicle;
    predicting when a deceleration event will occur based on the collected preceding vehicle information;
    adjusting a downshifting schedule of the transmission in response to predicting that the deceleration event will occur; and
    controlling an operation of the transmission such that the transmission executes one or more downshifting operations in accordance with the adjusted downshifting schedule.

2. The method of claim 1, further comprising:
    monitoring a speed of the preceding vehicle and a distance between the preceding vehicle and the host vehicle using the collected preceding vehicle information; and
    predicting that the deceleration event will occur based on the speed of the preceding vehicle and the distance between the preceding vehicle and the host vehicle.

3. The method of claim 2, further comprising:
    detecting a change of the speed of the preceding vehicle or a change of the distance between the preceding vehicle and the host vehicle;
    determining when the preceding vehicle is decelerating based on the change of the speed of the preceding vehicle or the change of the distance between the preceding vehicle and the host vehicle; and
    predicting that the deceleration event will occur when the preceding vehicle is determined to be decelerating.

4. The method of claim 2, further comprising:
    detecting a change of the speed of the preceding vehicle or a change of the distance between the preceding vehicle and the host vehicle;
    determining when the preceding vehicle is decelerating based on the change of the speed of the preceding vehicle or the change of the distance between the preceding vehicle and the host vehicle; and
    predicting that the deceleration event will occur when the preceding vehicle is determined to be decelerating and the preceding vehicle is located within a predetermined distance of the host vehicle.

5. The method of claim 2, further comprising:
    detecting a change of the speed of the preceding vehicle or a change of the distance between the preceding vehicle and the host vehicle;
    determining when the preceding vehicle is decelerating based on the change of the speed of the preceding vehicle or the change of the distance between the preceding vehicle and the host vehicle; and
    predicting that the deceleration event will occur when the preceding vehicle is determined to be decelerating beyond a predetermined deceleration value.

6. The method of claim 1, wherein the adjusting of the downshifting schedule comprises:
    selecting a predefined downshifting schedule among a plurality of predefined downshifting schedules; and
    adjusting the downshifting schedule based on the selected predefined down shifting schedule.

7. The method of claim 1, wherein the adjusting of the downshifting schedule comprises:
    collecting environmental information characterizing a surrounding environment of the host vehicle using the one or more sensing devices;
    detecting a traffic event based on the collected environmental information; and
    adjusting the downshifting schedule based on the detected traffic event.

8. The method of claim 1, wherein the adjusting of the downshifting schedule comprises:

collecting environmental information characterizing a surrounding environment of the host vehicle using the one or more sensing devices;
detecting a traffic sign based on the collected environmental information; and
adjusting the downshifting schedule based on the detected traffic sign.

9. The method of claim 1, wherein the adjusting of the downshifting schedule comprises:
collecting environmental information characterizing a surrounding environment of the host vehicle using the one or more sensing devices;
detecting a road characteristic based on the collected environmental information; and
adjusting the downshifting schedule based on the detected road characteristic.

10. The method of claim 1, wherein the adjusting of the downshifting schedule comprises:
detecting at least one of a speed of the host vehicle and an acceleration amount of the host vehicle; and
adjusting the downshifting schedule based on the at least one of the speed of the host vehicle and the acceleration amount of the host vehicle.

11. The method of claim 1, further comprising:
collecting environmental information characterizing a surrounding environment of the host vehicle using the one or more sensing devices; and
detecting a presence of the preceding vehicle based on the collected environmental information.

12. The method of claim 1, further comprising:
determining when to adjust the downshifting schedule based on whether the deceleration event predicted to occur.

13. The method of claim 1, further comprising:
controlling the operation of the transmission in accordance with a default downshifting schedule in response to predicting that the deceleration event will not occur.

14. The method of claim 1, further comprising:
adjusting the downshifting schedule before the host vehicle performs a braking operation in response to the predicted deceleration event.

15. The method of claim 1, wherein the collecting of the preceding vehicle information comprises:
receiving, via a vehicle-to-everything (V2X) communication system of the host vehicle, V2X messages transmitted using V2X communication; and
collecting the preceding vehicle information from the received V2X messages.

16. The method of claim 1, wherein the collecting of the preceding vehicle information comprises:
detecting environmental information characterizing a surrounding environment of the host vehicle using one or more sensing devices of advanced driver-assistance system (ADAS) equipped in the host vehicle; and
collecting the preceding vehicle information from the detected environmental information.

17. The method of claim 16, wherein the one or more sensing devices includes one or more of a camera, a radar sensing device, a light detection and ranging (LiDAR) sensing device, an ultrasonic sensing device, and a global positioning system (GPS) device.

18. A host vehicle equipped with a data sensing system comprising:
one or more sensing devices of the data sensing system configured to collect preceding vehicle information characterizing a preceding vehicle which precedes the host vehicle; and
a control unit configured to:
predict when a deceleration event will occur based on the collected preceding vehicle information,
adjust a downshifting schedule of a transmission of the host vehicle in response to predicting that the deceleration event will occur, and
control an operation of the transmission such that the transmission executes one or more downshifting operations in accordance with the adjusted downshifting schedule.

19. A non-transitory computer readable medium containing program instructions for performing a method of controlling a transmission of a host vehicle, the computer readable medium comprising:
program instructions that predict when a deceleration event will occur based on preceding vehicle information characterizing a preceding vehicle which precedes the host vehicle, the preceding vehicle information being collected using one or more sensing devices of a data sensing system equipped in the host vehicle;
program instructions that adjust a downshifting schedule of a transmission of the host vehicle in response to predicting that the deceleration event will occur; and
program instructions that control an operation of the transmission such that the transmission executes one or more downshifting operations in accordance with the adjusted downshifting schedule.

* * * * *